(12) United States Patent
Reid et al.

(10) Patent No.: US 8,531,791 B1
(45) Date of Patent: Sep. 10, 2013

(54) METHODS FOR ADAPTIVE THROTTLING OF DATA REFRESH OPERATIONS AND DISK DRIVES IMPLEMENTING THE SAME

(75) Inventors: Bruce E. Reid, Irvine, CA (US); Robert M. Fallone, Newport Beach, CA (US); Kaustubh S. Patkar, Agoura Hills, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 42 days.

(21) Appl. No.: 13/364,186

(22) Filed: Feb. 1, 2012

(51) Int. Cl.
*G11B 27/36* (2006.01)

(52) U.S. Cl.
USPC .............................................. 360/31; 360/53

(58) Field of Classification Search
USPC .................. 360/31, 53, 75, 78.09, 60, 97.12, 360/77.08, 78.14; 711/112, 106, 167; 710/45, 710/58
See application file for complete search history.

(56) References Cited

U.S. PATENT DOCUMENTS

| | | | |
|---|---|---|---|
| 5,909,334 A | 6/1999 | Barr et al. | |
| 6,289,484 B1 | 9/2001 | Rothberg et al. | |
| 6,327,106 B1 | 12/2001 | Rothberg | |
| 6,429,984 B1 | 8/2002 | Alex | |
| 6,462,896 B1 | 10/2002 | Codilian et al. | |
| 6,628,466 B2 | 9/2003 | Alex | |
| 6,650,492 B2 | 11/2003 | Lenny et al. | |
| 6,691,255 B1 | 2/2004 | Rothberg et al. | |
| 6,781,780 B1 | 8/2004 | Codilian | |
| 6,809,893 B2 | 10/2004 | Uzumaki et al. | |
| 6,854,022 B1 | 2/2005 | Thelin | |
| 6,854,071 B2 | 2/2005 | King et al. | |
| 6,950,967 B1 | 9/2005 | Brunnett et al. | |
| 6,987,630 B1 | 1/2006 | Higgins et al. | |
| 7,043,598 B2 | 5/2006 | Wu et al. | |
| 7,050,252 B1 | 5/2006 | Vallis | |
| 7,173,782 B2 | 2/2007 | Ikeda et al. | |
| 7,177,979 B2 | 2/2007 | Kuwamura | |
| 7,196,860 B2 | 3/2007 | Alex | |
| 7,345,837 B1 | 3/2008 | Schreck et al. | |
| 7,349,179 B1 | 3/2008 | He et al. | |
| 7,570,445 B2 | 8/2009 | Alfred et al. | |
| 7,649,704 B1 | 1/2010 | Bombet et al. | |
| 7,663,933 B2 | 2/2010 | Tsukazaki et al. | |
| 7,672,072 B1 * | 3/2010 | Boyle et al. | 360/31 |
| 7,870,460 B2 | 1/2011 | Iketaki et al. | |
| 7,872,822 B1 | 1/2011 | Rothberg | |
| 7,945,727 B2 * | 5/2011 | Rothberg et al. | 711/112 |
| 7,974,029 B2 * | 7/2011 | Tsai et al. | 360/31 |
| 8,320,067 B1 | 11/2012 | Tsai et al. | |
| 2004/0128433 A1 | 7/2004 | Bains | |
| 2004/0268033 A1 | 12/2004 | Chia et al. | |
| 2005/0207049 A1 | 9/2005 | Ikeda et al. | |
| 2008/0239808 A1 | 10/2008 | Lin | |

(Continued)

*Primary Examiner* — Nabil Hindi

(57) ABSTRACT

A method of refreshing data on a hard disk drive configured to carry out commands issued by a host that comprises tracking run-time conditions related to patterns of host command activity on the hard disk drive; selecting an entry from a high priority pool that is configured to hold a predetermined maximum number of entries, each entry comprising a plurality of tracks having been designated as being eligible for a high priority refresh operation as a result of the host command activity; refreshing data stored on at least one track of the selected entry; pausing the refreshing for a period of time equal to a throttle interval to process at least one command issued by the host before returning to the selecting or to the refreshing, and periodically modifying a value of the throttle interval depending upon the tracked run-time conditions.

22 Claims, 2 Drawing Sheets

(56) References Cited

U.S. PATENT DOCUMENTS

2009/0027799 A1 1/2009 Rothberg et al.
2009/0244775 A1 10/2009 Ehrlich
2010/0165502 A1 7/2010 Iketaki et al.
2011/0019302 A1 1/2011 Aoki et al.

* cited by examiner

METHODS FOR ADAPTIVE THROTTLING OF DATA REFRESH OPERATIONS AND DISK DRIVES IMPLEMENTING THE SAME

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo control system to control the velocity of the actuator arm as it seeks from track to track.

During a write operation, a current is applied to a write element of the head (e.g., a write coil) to create a magnetic field that magnetizes the surface of the disk by orienting the direction of magnetic grains (e.g., horizontally in longitudinal magnetic recording, or vertically in perpendicular magnetic recording). The orientation of the grains exhibits hysteresis whereby they generate their own magnetic field when the write magnetic field is removed. During a read operation, a read element of the head (e.g., a magnetoresistive (MR) element) transduces the magnetic field emanating from the disk surface into a read signal that is demodulated into an estimated data sequence.

The magnetic grains on the disk drive media do not stay oriented in a particular direction permanently. Over time, the grains will orientate into random directions (a phenomenon known as magnetic entropy) until the magnetic field can no longer be sensed reliably (leading to data errors during reproduction). Magnetic entropy may also be precipitated by various factors, such as increasing ambient temperature. That is, at higher temperatures, the uniform alignment of the grains will degrade faster. Other factors that precipitate magnetic entropy comprise the phenomena referred to as Wide Area Track ERasure (WATER) and adjacent track interference (ATI) wherein when writing data to a target track, the fringe field from the write element degrades the uniform alignment of the grains recorded in an adjacent track or tracks. The degrading effect of ATI on the adjacent tracks compounds over time with each write operation to the target track. The extent to which adjacent tracks are affected by such fringe field is based upon their proximity to the track to which the head is writing, with closer tracks experiencing a greater degree of magnetic degradation than tracks that are comparatively further away from the currently written track. Eventually, the magnetic field emanating from the disk surface will deteriorate to the point that the data is no longer reliably recoverable.

FIG. 1 shows a prior art disk format 2 comprising a number of data tracks 4 defined by concentric servo sectors $6_0$-$6_N$ recorded around the circumference of each data track. Each servo sector $6_i$ comprises a preamble 8 for storing a periodic pattern that allows proper gain adjustment and timing synchronization of the read signal, and a sync mark 10 for storing a special pattern used to synchronize to a servo data field 12. The servo data field 12 stores coarse head positioning information, such as a servo track address, used to position the head over a target data track during a seek operation. Each servo sector $6_i$ further comprises groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

Due to the unavoidable nature of ATI and WATER, refresh activity is essential in order to preserve data integrity during many use-case scenarios. During a refresh operation, the data from the track to be refreshed is read into a non-volatile memory (that retains stored information even when power is interrupted), read out of the non-volatile memory and re-written to disk. However, refresh activity must compete with other firmware operations for processor bandwidth and other system resources. As host write activity continuously causes magnetic degradation of data residing in close proximity to the write head, affected regions eventually need to be refreshed. The urgency of such refresh activity increases in proportion to the type, duration, and intensity of host write activity, eventually reaching a high priority threshold, at which point failure to refresh in a timely manner will result in loss of data.

Under conditions of heavy and uninterrupted random write activity, the number of zones containing tracks that store data that have become eligible for a high priority refresh operation becomes sufficiently large that increased refresh activity can threaten to consume processor bandwidth to such an extent that the drive cannot respond efficiently to host requests, and performance may be noticeably degraded. Current refresh schemes attempt to mitigate the problem by using a fixed high-priority throttle interval to slow the refresh activity, which yields more bandwidth with which to process host I/O requests. The problem with that fixed throttle approach is that given variable host traffic patterns and workloads, it is difficult to choose a single fixed throttle value that achieves an acceptable balance between refresh urgency and responsiveness to host requests. Indeed, failure to refresh sufficiently aggressively risks data loss, while excessively aggressive refresh activity unnecessarily degrades performance from the host's perspective.

What are needed, therefore, are methods for refreshing data on a hard disk drive that do not suffer from the aforementioned disadvantages, and hard disk drives incorporating such methods.

DETAILED DESCRIPTION

Figure 1:
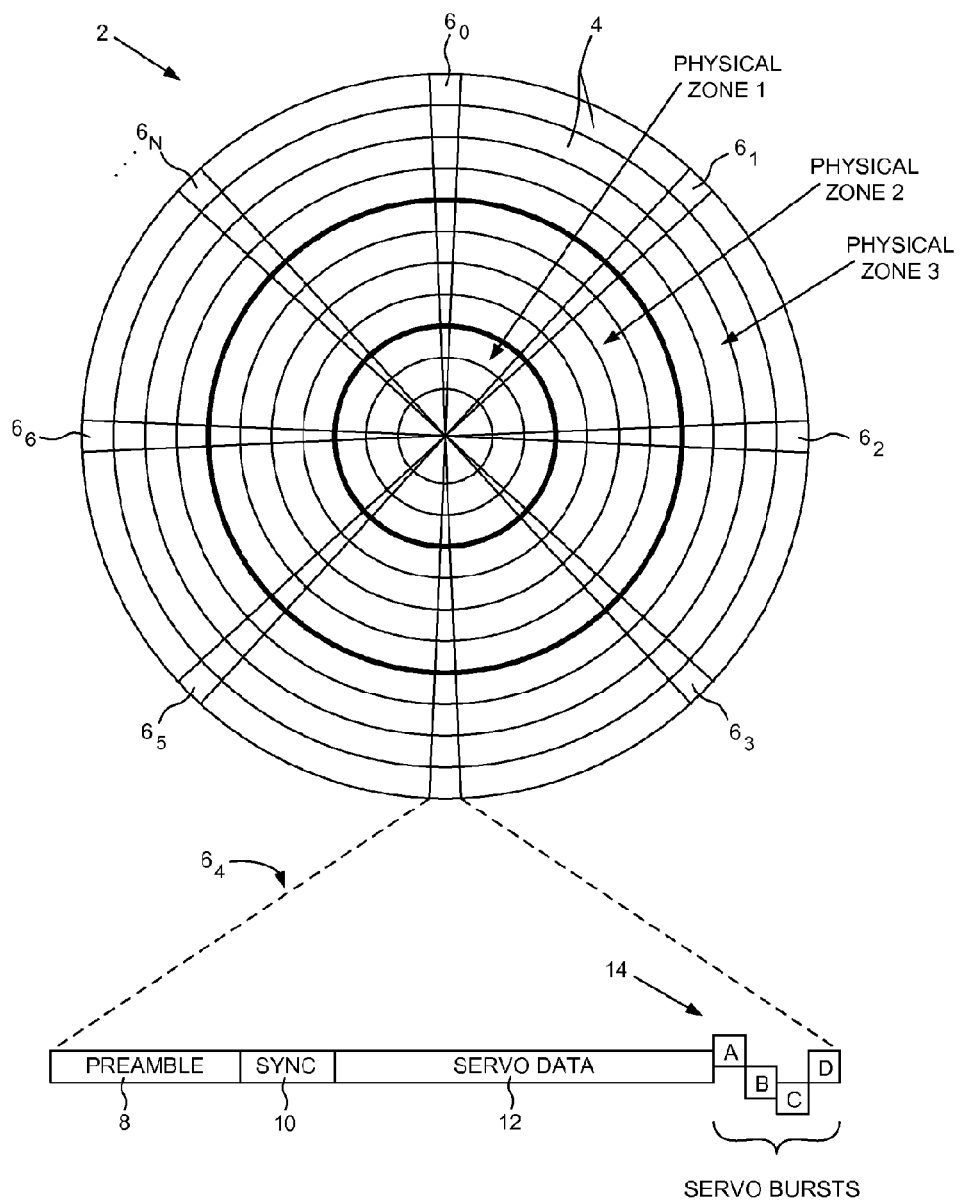
FIG. 1 shows a prior art disk format that comprises a plurality of tracks defined by embedded servo sectors.
Figures 2A, 2B:
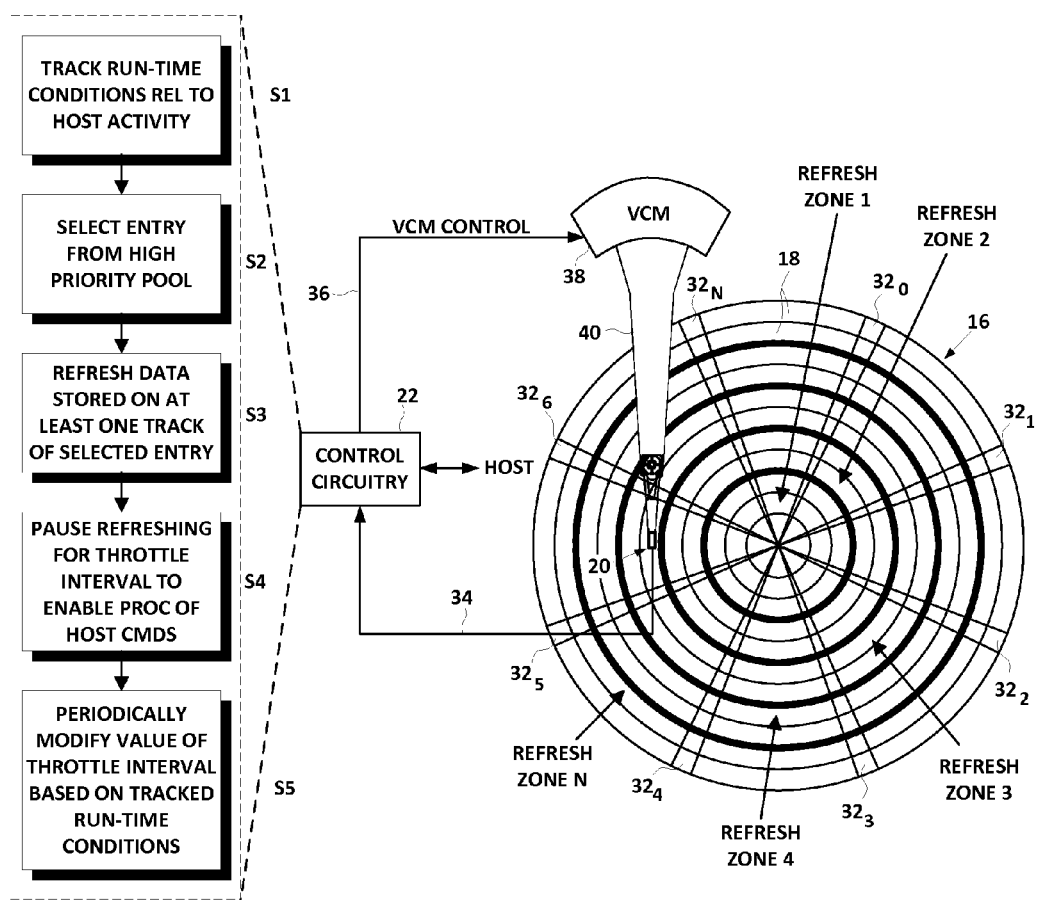
FIG. 2A shows a disk drive according to one embodiment, comprising a head actuated over a disk, and control circuitry.
FIG. 2B is a flow chart executed by the control circuitry according to one embodiment.

FIG. 2A shows a disk drive according to an embodiment. The disk drive comprises a disk 16 having a plurality of tracks 18, and a head 20 actuated over the disk 16. A plurality of refresh zones (also called zip codes) are defined, wherein each refresh zone comprises a plurality of tracks 18. In one embodiment, the disk drive further comprises control circuitry 22 operable, among other functionality, to execute the flow diagram of FIG. 2B. In the embodiment of FIG. 2A, the disk 16 comprises a plurality of embedded servo sectors $32_0$-$32_N$ that define the plurality of tracks 18. Each servo sector $32_i$ comprises head positioning information such as a track address for coarse positioning during seeks, and servo bursts for fine positioning while tracking the centerline of a target track during write/read operations. The control circuitry 22 processes a read signal 34 emanating from the head 20 to demodulate the servo sectors into a position error signal (PES). The PES is filtered with a suitable compensation filter to generate a control signal 36 applied to a VCM 38 which rotates an actuator arm 40 about a pivot in a direction that reduces the PES.

According to one embodiment, one or more pools (e.g., low, medium and high priority) may be provided. A pool may be thought of as a logical construct configured to store references to refresh zones or zip codes. As data is written to various tracks, the refresh zone(s) or zip code(s) of tracks adjacent to the tracks or tracks being written to may be pushed into the low, medium or high priority pools. Considering now (for example), the high priority pool, this pool may comprise a predetermined maximum number of entries, with each entry a refresh zone or zip code that comprises a plurality of tracks having been designated as being eligible for a high priority refresh operation as a result of host command activity. The high priority pool may be sized so as to accommodate a maximum number of entries. For example, the maximum size of the high priority pool may be 32 entries, with each entry corresponding, according to an embodiment, to a refresh zone or zip code that comprises a plurality of tracks having been designated as being eligible for a high priority refresh operation. The high priority pool may be used, according to one embodiment, to refresh the data stored in the tracks of the corresponding refresh zone or zip code. For example, when the high priority pool is accessed, sampled and found to comprise a number of entries therein that exceeds a threshold number of entries, the data tracks of a selected entry in the high priority pool may be refreshed by reading and rewriting the data stored in the tracks. In one embodiment, the data of a refresh zone or zip code may be read and rewritten regardless of the degree to which the magnetic integrity of the data may have degraded. In other embodiments, the data in a refresh zone or zip code may be scanned first to determine whether a rewrite is necessary. For example, the data may be rewritten only if a number of detected error correction code (ECC) errors exceeds a predetermined threshold.

The refresh operation may be executed in any suitable manner and at any suitable time. In one embodiment, a refresh operation may be performed on a refresh zone or zip code or codes immediately after the high priority pool exceeds a predetermined threshold number of entries. In another embodiment, one or more selected refresh zones or zip codes may be scheduled for refresh after the high priority pool identifying them exceeds a predetermined threshold number of entries. Moreover, refresh operations may be executed during an idle mode of the disk drive (such as, for example, when the disk drive is not processing access commands received from a host) when aggressive refresh operations are unlikely to affect drive performance.

As noted above, current refresh schemes use a fixed high-priority throttle interval to slow the refresh activity sufficiently as to not impair drive performance. This fixed high priority throttle interval periodically pauses the refresh activity and enables the drive to process host commands for the duration of the high priority throttle interval. After the high priority throttle interval, the refresh activity may resume. As shown in FIG. 2B, one embodiment tracks or monitors run-time conditions relative to host write activity and/or patterns thereof as shown at S1 and uses such tracked run-time conditions to modify the high priority throttle interval such that the throttle interval is appropriately set and modified as necessary, depending upon the prevailing state of the drive. For example, the high priority throttle interval may be modified (i.e., be made shorter or longer) depending upon how busy the drive is in carrying out write commands or how full the high priority pool is. To do so, according to one embodiment, one or more entries from the high priority pool may be selected as shown at S2, with each entry comprising a plurality of tracks having been designated as being eligible for a high priority refresh operation as a result of the tracked host write activity. The high priority pool may, for example, be configured to hold a predetermined maximum number of entries such as, for example, 32 entries. As called for by block S3, the data stored on one or more tracks of the selected entry or entries may then be refreshed and their corresponding entry or entries removed from the high priority pool. After the track(s) is refreshed, the refreshing of the refresh zones or zip codes listed in the high priority pool may be paused for a period of time equal to a throttle interval, as shown at S4. During this throttle interval, the disk drive may process one or more host commands of reading and writing to the disk(s) 16. At the expiry of the throttle interval, the drive may return to the selecting block (S2) to select one or more further refresh zone(s) or zip code(s) to begin refresh operations, or may return to refresh other tracks in the currently selected refresh zone or zip code. According to one embodiment, the value of the throttle interval, namely, the length of the time period during which the host commands may be processed, may be periodically modified depending upon the tracked run-time conditions, as suggested at S5 in FIG. 2B.

This on-going periodic modification of the value of the high priority throttle interval provides an adaptive and dynamic high priority throttle feature that reacts to the prevailing run-time drive conditions, enabling refresh operations to take best advantage of periods of relative drive idleness by increasing the aggressiveness of the refresh operations and decreasing the aggressiveness of the refresh operations during times when the drive is processing frequent read and/or write commands, all the while safeguarding against data loss due to magnetic degradation of the magnetic domains representative of the stored data. According to one embodiment, upon each adjustment, an algorithm may choose, select or calculate an updated value for the high priority throttle interval based on run-time conditions related to patterns of host write activity. Such update may indicate that the throttle interval is decreased, stays the same or is increased. It is to be noted that although three such algorithms are disclosed herein, embodiments of the present inventions are not to be limited thereto, as those of skill in this art may recognize. Indeed, other algorithms for modifying the value of the high priority throttle may be developed by such persons of skill in this art, and all such algorithms are to be considered to be within the scope of the embodiments defined herein.

According to an embodiment, the modification of the high priority throttle may be limited to modifying the high priority throttle interval between predetermined minimum and a maximum throttle interval values. The minimum throttle interval value and the maximum throttle interval value correspond to a shortest and a longest period of time, respectively, during which commands issued by the host can be processed between successive data refreshes. For example, the minimum throttle interval may be set to, for example, 1 microsecond, and the maximum throttle interval may be set to, for example, 10 seconds. According to an embodiment, the minimum throttle interval may be set to, for example, 0.1 millisecond and the maximum throttle interval may be set to, for example, 2000 milliseconds. Other values and/or ranges for the values of the minimum and maximum throttle intervals may be chosen, within the context of the present embodiments.

The run-time conditions relative to host read and/or write activity, upon which the modifications or adjustments to the high priority throttle interval are based, may be determined or sampled periodically. This determination or rate at which the run-time conditions are periodically sampled may be selected to be more or less frequent, e.g., after completion of one or more refresh operations, upon completion of the refresh operations for one or more entire refresh zones or zip codes or at some interval entirely unrelated to refresh activity.

According to one embodiment, upon each sample event described above, a decision may be made as to whether the current high priority throttle interval should be modified or adjusted, and if so, by how much and in what direction (longer, leading to less aggressive refreshes, no change, or shorter, leading to comparatively more aggressive refreshes). Accordingly, a goal of one or more embodiments is to reduce the aggressiveness of refresh activity when there are few entries to be refreshed in the high priority pool, and to increase that aggressiveness as more entries become eligible for high priority refresh (through inclusion of their respective refresh zones or zip codes in the high priority pool). The algorithm used to yield the modification decision may be implemented in a variety of ways, as those of skill in this art may appreciate.

According to one embodiment, the algorithms used to determine whether the high priority throttle interval should be modified and the value of that modification may utilize a minimum throttle interval value and a maximum throttle interval value and the algorithm may be configured such that the resulting value of the modification remains within a range between the aforementioned minimum throttle interval value and maximum throttle interval value.

In one embodiment, the first such exemplary algorithm to determine whether the high priority throttle interval should be modified and the value of such modification is a proportional algorithm. According to the proportional algorithm, upon each sample event, the high priority throttle is adjusted as a function of the "fullness" of (e.g., number of entries in) the high priority pool. In this exemplary algorithm used in one embodiment, the magnitude of the new throttle interval (relative to its currently configured minimum throttle interval and the maximum throttle interval limits) may be chosen to be inversely proportional to the current size of the pool (relative to its peak/empty limits). That is, the magnitude of the new throttle interval may be chosen to be inversely proportional to the number of entries currently populating the high priority pool (the pool having a predetermined maximum capacity such as, for example, 32 entries). Thus, as the high priority pool becomes populated with a greater number of entries (of refresh zones or zip codes), refresh becomes more aggressive as the value of the throttle interval decreases, and vice versa. Examples are set forth below, assuming a minimum throttle interval of 0.1 milliseconds, a maximum throttle interval of 2000 milliseconds, and a pool peak size of 32 entries:

a. If the pool is empty, the value of the throttle interval is set to 2000 milliseconds.
   b. If the pool is full, the value of the throttle interval is set to 0.1 milliseconds
   c. If the current pool size is 24 entries (75 percent of its peak of 32 entries), the throttle interval is set as follows:

EmptinessFactor=(1.0−(24/32))=(1.0−0.75)=0.25

ThrottleRange=(max$_{TR}$−min$_{TR}$)=(2000−0.1)=1999.9

NewThrottle=(min$_{TR}$+ (EmptinessFactor*ThrottleRange))=(0.1+ (0.25*1999.9))=(0.1+499.975)=500.075 milliseconds According to this method of determining the throttle interval value as used in one embodiment, when the high priority pool is 75% full, the value of the throttle interval is set at 500.75 milliseconds, meaning that the drive may process host commands for 500.75 milliseconds before resuming refresh operations. This value may be re-computed after, for example, the next refresh operation, so as to enable the refresh operations to dynamically adjust, depending upon the fullness of the high priority pool. In one embodiment, this balances the need to maintain the magnetic integrity of the data with the need to efficiently respond to host commands.

One embodiment uses the second approach to modifying the value of the throttle interval, which comprises utilizing a counter to track the total number of zones or zip codes that are comprised in the high priority pool (that is, those refresh zones or zip codes whose write frequency counters have reached the high priority threshold and are thus eligible for a high priority refresh). Upon each sample event, the value of the throttle interval may be incrementally adjusted (up or down or unchanged) by an amount computed as a multiple of a configured increment parameter, that multiple based on a rate of change of the number of high priority zip codes currently in the high priority pool. To calculate the new value of the throttle interval, the change in the number of high priority entries (DeltaNumZips) is determined and multiplied by a throttle increment parameter (IncParam). For example, if the number of high priority entries has increased by five since the previous sample (DeltaNumZips=5), and if the increment parameter is configured to be 1 millisecond (IncParam=1 millisecond), then the high priority throttle will be reduced by 5 milliseconds (1 millisecond*(−5)). Conversely, if the number of high priority entries in the high priority pool has decreased by 3, then the value of the throttle interval will be increased by 3 milliseconds (1 millisecond*(+3)).

One embodiment employs a third approach to dynamically modify the throttle interval value, and utilizes a closed-loop system and a throttle increment parameter to influence the amount by which the interval should be adjusted during each sample event. The system is sampled periodically to determine the rate of change of zip codes or zones over time and adapt accordingly. Conceptually, this method may utilize a proportional factor, such as the DeltaNumZips variable described above. This proportional factor may then be integrated over time (DeltaNumZips*SampleTime), and the rate of change of the number of zones or zip codes or needing a refresh may be accounted for (DeltaNumZips/SampleTime). Therefore, the new value of the throttle time may be computed as follows in one embodiment, which computation comprises a proportional portion, an integral portion and a derivative portion:

$$\text{Throttle Interval} = Kp * (Zt) + Ki \int_0^t Z(x)\,dt + Kd * \frac{Zt - Zt'}{t - t'},$$

where
   Kp=Proportional constant
   Zt=Number of Zip Codes to refresh at time t
   Zt'=Number of Zip Codes to refresh at time t'
   Ki=Integral constant
   Z(x)=Number of zip codes integrated over the time interval 0 through t
   Kd=Differential constant The value of the throttle interval, therefore, is inversely proportional to the amount of refresh needed. If DeltaNumZips (Zt−Zt') is 0, a steady state has been reached and the current throttle interval is accurate.

Under conditions of heavy and uninterrupted random write activity, conventional refresh algorithms may allow the high priority pool to reach dangerously high levels, leading to possible loss of data. One embodiment is configured to adaptively reduce the peak levels of the high priority pool, at the cost of slightly degraded Input-Output Operations per second (IOPS) and/or host command completion times. Under conditions of intermittent host command intensity, in which there are intermittent periods of increased bandwidth available for background activity such as refreshes, conventional refresh algorithms continue to refresh with the same level of aggressiveness as they do during periods of comparatively higher host command intensity. One or more embodiments, on the other hand, dynamically adapt to the level of host command intensity such that during periods of less frequent host commands, the throttle interval will be longer, allowing host commands to complete more quickly, thus improving IOPS/host command completion times.

While certain embodiments of the inventions have been described, these embodiments have been presented by way of example only, and are not intended to limit the scope of the inventions. Indeed, the novel methods, devices and systems described herein may be embodied in a variety of other forms. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions. For example, those skilled in the art will appreciate that in various embodiments, the actual refresh algorithms may differ from those described herein. Depending on the embodiment, certain of the steps described herein may be removed, others may be added, and the sequence of steps may be altered and/or performed in parallel. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, comprising embodiments which do not provide all of the features and advantages set forth herein, are also within the scope of this disclosure. Accordingly, the scope of the present disclosure is intended to be defined only by reference to the appended claims.

The invention claimed is:

1. A method of refreshing data on a hard disk drive configured to carry out commands issued by a host, comprising:
    tracking run-time conditions related to patterns of host command activity on the hard disk drive;
    selecting an entry from a high priority pool that is configured to hold a predetermined maximum number of entries, each entry comprising a plurality of tracks having been designated as being eligible for a high priority refresh operation as a result of the host command activity;
    refreshing data stored on at least one track of the selected entry;
    pausing the refreshing for a period of time equal to a throttle interval to process at least one command issued by the host before returning to the selecting or to the refreshing, and
    periodically modifying a value of the throttle interval depending upon the tracked run-time conditions.

2. The method of claim 1, wherein the value of the throttle interval in the modification is limited between a minimum and a maximum throttle interval value, the minimum throttle interval value and the maximum throttle interval value corresponding to a shortest and a longest period of time, respectively, during which commands issued by the host can be processed between successive data refreshes.

3. The method of claim 1, wherein modifying modifies the value of the throttle interval as a function of a state of the high priority pool.

4. The method of claim 1, wherein the state of the high priority pool is a function of how full the high priority pool is.

5. The method of claim 2, further comprising:
    setting the value of the throttle interval to the minimum throttle interval value when the high priority pool holds at least a selected threshold number of entries.

6. The method of claim 2, further comprising setting the value of the throttle interval to the maximum throttle interval value when the high priority pool holds less than a selected threshold number of entries.

7. The method of claim 1, wherein modifying comprises calculating a new value for the throttle interval as a function of how full the high priority pool is and setting the value of the throttle interval to the calculated new value.

8. The method of claim 1, wherein modifying comprises increasing the value of the throttle interval when the high priority pool is relatively empty or decreasing the value of the throttle interval when the high priority pool is relatively full.

9. The method of claim 1, wherein modifying comprises decreasing the value of the throttle interval as a function of a number of entries recently added to the high priority pool or increasing the value of the throttle interval as a function of a number of entries by which the high priority pool has recently decreased.

10. The method of claim 1, wherein modifying comprises increasing or decreasing the value of the throttle time in a closed loop system that is sampled periodically to determine a rate of change of the entries in the high priority pool and to modify the value of the throttle time according to the determined rate of change.

11. The method of claim 1, wherein modifying comprises modifying the value of the throttle time in inverse relation to a rate at which data refreshes are needed to maintain a magnetic integrity of the data stored in the plurality of tracks in each entry of the high priority pool.

12. A hard disk drive configured to carry out commands issued by a host, comprising:
    a disk;
    a head configured to read and write data to the disk, and
    a processor, the processor being controlled by a program that causes the processor to:
    track run-time conditions related to patterns of host command activity on the hard disk drive;
    select an entry from a high priority pool that is configured to hold a predetermined maximum number of entries, each entry comprising a plurality of tracks having been designated as being eligible for a high priority refresh operation as a result of the host command activity;
    refresh data stored on at least one track of the selected entry;
    pause the refreshing for a period of time equal to a throttle interval to process at least one command issued by the host before returning to the selecting or to the refreshing, and
    periodically modify a value of the throttle interval depending upon the tracked run-time conditions.

13. The hard disk drive of claim 12, wherein the value of the throttle interval is limited between a minimum and a maximum throttle interval value, the minimum throttle interval value and the maximum throttle interval value corresponding to a shortest and a longest period of time, respectively, during which commands issued by the host can be processed between successive data refreshes.

14. The hard disk drive of claim 12, wherein the modifying modifies the value of the throttle interval as a function of a state of the high priority pool.

15. The hard disk drive of claim 12, wherein the state of the high priority pool is a function of how full the high priority pool is.

16. The hard disk drive of claim 13, wherein the program further causes the processor to:
set the value of the throttle interval to the minimum throttle interval value when the high priority pool holds at least a selected threshold number of entries.

17. The hard disk drive of claim 13, wherein the processor is configured to set the value of the throttle interval to the maximum throttle interval value when the high priority pool holds less than a selected threshold number of entries.

18. The hard disk drive of claim 12, wherein the modifying comprises calculating a new value for the throttle interval as a function of how full the high priority pool is and setting the value of the throttle interval to the calculated new value.

19. The hard disk drive of claim 12, wherein the modifying comprises increasing the value of the throttle interval when the high priority pool is relatively empty or decreasing the value of the throttle interval when the high priority pool is relatively full.

20. The hard disk drive of claim 12, wherein the modifying comprises decreasing the value of the throttle interval as a function of a number of entries recently added to the high priority pool or increasing the value of the throttle interval as a function of a number of entries by which the high priority pool has recently decreased.

21. The hard disk drive of claim 12, wherein the modifying comprises increasing or decreasing the value of the throttle time in a closed loop system that is sampled periodically to determine a rate of change of the entries in the high priority pool and to modify the value of the throttle time according to the determined rate of change.

22. The hard disk drive of claim 12, wherein the modifying comprises modifying the value of the throttle time in inverse relation to a rate at which data refreshes are needed to maintain a magnetic integrity of the data stored in the plurality of tracks in each entry of the high priority pool.

* * * * *